(12) United States Patent
Meacham et al.

(10) Patent No.: US 7,224,096 B2
(45) Date of Patent: *May 29, 2007

(54) ROTATABLE ASSEMBLIES HAVING CHEMICALLY BONDED LAMINATION STACKS

(75) Inventors: Walter L. Meacham, Phoenix, AZ (US); Mambailykalathil N. Menon, Gilbert, AZ (US)

(73) Assignee: Honeywell International Inc., Morristown, NJ (US)

( * ) Notice: Subject to any disclaimer, the term of this patent is extended or adjusted under 35 U.S.C. 154(b) by 142 days.

This patent is subject to a terminal disclaimer.

(21) Appl. No.: 10/884,418

(22) Filed: Jul. 3, 2004

(65) Prior Publication Data

US 2005/0034295 A1    Feb. 17, 2005

Related U.S. Application Data

(60) Continuation-in-part of application No. 09/643,970, filed on Aug. 22, 2000, now Pat. No. 6,772,503, which is a division of application No. 08/951,600, filed on Oct. 16, 1997, now Pat. No. 6,121,709.

(51) Int. Cl.
*H02K 1/06* (2006.01)
*H02K 1/12* (2006.01)
*H02K 15/10* (2006.01)

(52) U.S. Cl. ......................... 310/217; 310/45

(58) Field of Classification Search ............... 310/45, 310/216, 217, 261; 29/598, 609; 336/213, 336/219, 234
See application file for complete search history.

(56) References Cited

U.S. PATENT DOCUMENTS

| | | | |
|---|---|---|---|
| 3,652,355 A |   | 3/1972  | Herrick |
| 3,670,278 A | * | 6/1972  | Foster et al. ............... 336/213 |
| 3,802,068 A |   | 4/1974  | Scott |
| 3,803,431 A |   | 4/1974  | Inaba et al. |
| 3,840,983 A |   | 10/1974 | Ryff |
| 4,025,379 A |   | 5/1977  | Whetstone |
| 4,103,195 A | * | 7/1978  | Torossian et al. ........... 310/259 |
| 4,110,644 A |   | 8/1978  | Roddy |
| 4,197,975 A |   | 4/1980  | Williamson |
| 4,227,108 A | * | 10/1980 | Washizu et al. ............ 310/214 |
| 4,255,494 A |   | 3/1981  | Reen et al. |
| 4,263,711 A |   | 4/1981  | Sakano et al. |
| 4,489,249 A |   | 12/1984 | Olivier |
| 4,499,660 A |   | 2/1985  | Lenz |
| 4,585,967 A |   | 4/1986  | Mayer et al. |
| 4,868,970 A |   | 9/1989  | Schultz et al. |
| 4,912,350 A |   | 3/1990  | Parshall et al. |
| 4,970,424 A |   | 11/1990 | Nakamura et al. |
| 5,075,585 A |   | 12/1991 | Teruyama et al. |
| 5,200,662 A |   | 4/1993  | Tagami et al. |

(Continued)

FOREIGN PATENT DOCUMENTS

WO    WO 009730504    8/1997

*Primary Examiner*—Tran Nguyen
(74) *Attorney, Agent, or Firm*—Oral Caglar

(57) ABSTRACT

A rotor assembly or other rotating device having a stack of laminations or laminates that are chemically bonded together. Chemical bond of the laminates may have a strength that approaches the strength of the material of metal laminates. Chemical bonds may be effective in holding the laminates at temperatures when subject to rigorous mechanical operations such as high rotation speed and vibration.

56 Claims, 13 Drawing Sheets

U.S. PATENT DOCUMENTS

| | | |
|---|---|---|
| 5,477,092 A | 12/1995 | Tarrant |
| 5,534,736 A | 7/1996 | Johnson |
| 5,563,463 A | 10/1996 | Stark |
| 5,608,370 A | 3/1997 | Jang |
| 5,760,520 A * | 6/1998 | Hasebe et al. .............. 310/261 |
| 5,875,540 A | 3/1999 | Sargeant et al. |
| 5,893,205 A | 4/1999 | McClelland |
| 6,047,460 A | 4/2000 | Nagate et al. |
| 6,121,709 A * | 9/2000 | Fathimulla et al. ......... 310/216 |
| 6,301,773 B1 | 10/2001 | Chemburkar |
| 6,772,503 B1 * | 8/2004 | Fathimulla et al. ........... 29/598 |
| 6,995,484 B1 * | 2/2006 | Heimann et al. ............. 310/45 |
| 2001/0001895 A1 | 5/2001 | Setiabudi et al. |

* cited by examiner

ROTATABLE ASSEMBLIES HAVING CHEMICALLY BONDED LAMINATION STACKS

The present invention is a continuation-in-part application of U.S. patent application Ser. No. 09/643,970, filed Aug. 22, 2000 now U.S. Pat. No. 6,772,503, by Fathimulla et al., and entitled "Rotor Assembly Having Bonded Lamination Stack". U.S. patent application Ser. No. 09/643,970 is a Divisional Application of U.S. patent application Ser. No. 08/951,600, filed Oct. 16, 1997, which issued as U.S. Pat. No. 6,121,709, on Sep. 19, 2000.

The present application is related to U.S. Pat. No. 6,122,817, issued on Sep. 26, 2000, by Meacham et al., and entitled "Rotor Assembly Having Lamination Stack That Is Separately Piloted and Clamped", which is herein incorporated by reference.

BACKGROUND

The invention relates generally to electrical machines. Particularly, the invention relates to a laminated rotor and/or stator assemblies for electrical machines or any electromagnetic devices.

SUMMARY

An electrical or any elector-magnetic device may have a laminated rotor and/or laminated stator assembly. The rotor assembly of may have a stack of chemically bonded laminates. End caps of the rotor may also be chemically bonded as a part of the rotor assembly. The stator assembly may have a stack of chemically bonded laminates. End caps of the stator may also be chemically bonded as part of the stator assembly.

DESCRIPTION

Figure 1:
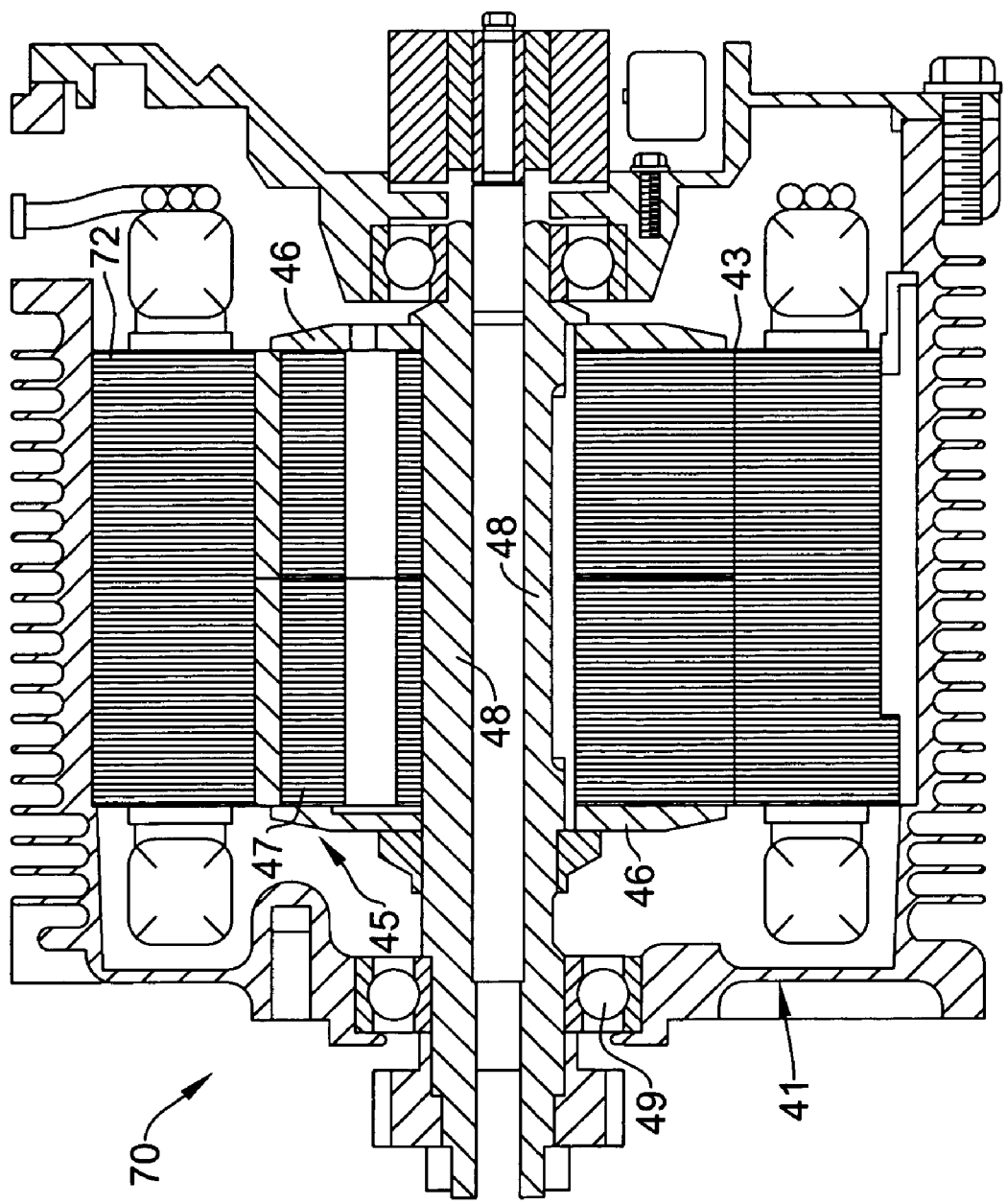
FIG. 1 shows an illustrative example of an electrical machine having laminated rotor assembly and laminated stator assembly.

An electrical machine 70 may have a laminated stator assembly 72 and laminated rotor assembly 45. The laminated rotor assembly may be supported by bearings 49 to an electrical machine housing 41. The laminated stator assembly may be supported by the electrical machine housing 41. There may be a small operating clearance 43 between the stator 72 and the rotor 45.

A design approach for a laminated rotor assembly may include the shrink fit of a stack of laminates onto a shaft. The resulting shrink fit may be used to transmit torque from the laminates to the shaft as well as maintain a radial pilot between the shaft and the laminates. These laminates are sometimes clamped to provide an axial load on the laminates. Such an assembly 45 is shown in FIG. 1. FIG. 1 shows end caps 46, laminates 47 and main rotor shaft 48. The main rotor shaft 48 cross-section may serve as the bolt to secure the end caps 46. The axial load may have large changes during operation, resulting in a large variation in clamp load across the lamination stack.

Bending stiffness of a rotor is an important factor in minimizing rotor deflections during operation. For the cases where the laminates have no axial load, or a light load (less than 1000 PSI), the main shaft rotor 48 may provide the bending stiffness of the system. Bending stiffness may be a direct function of the modulus of elasticity of the rotor material (E), the outer diameter of the rotor and the length of the rotor. Approaches to increase the bending stiffness of a laminated rotor include increasing the stiffness of the lamination stack, increasing the diameter of the rotor and/or decreasing the length of the rotor.

An approach to increase rotor bending stiffness may be to increase the rotor diameter. For increased rotor diameter, the required radial fit between the laminates and shaft may increase. This increased fit may require a high axial load to compress the lamination due to frictional effects at the laminates to shaft press-fit. This may limit such rotor assemblies to tip speed less than 900 ft/sec. (Note that tip speed is a method of normalizing a diameter of a rotor to its operational speed. For example, a 12" diameter (6" radius) rotor running at 16,000 RPM would have a tip speed of 837 ft/sec. An 18" diameter (9" radius) rotor running at 16,000 RPM would have a tip speed of 1256 ft/sec. Also, a 12" diameter (6" Radius) rotor running at 24,000 RPM would have a tip speed of 1256 ft/sec. Either one of the rotors with a tip speed of 1256 ft/sec would have similar design constraints).

This limitation may be overcome with compressed laminated rotors with a compression level of greater than 2 KSI. It may be possible to achieve tip speed in excess of 1100 ft/sec by using a separate shaft for piloting and for clamping the laminate stack.

Another approach may be to bond the lamination stack to improve its effective Young's Modulus (E). However, the use of glues, adhesives and the like on a stack of laminations has limited effects on its effective Young's Modulus. Glues and adhesives do not provide such stacks of laminates adequate strength or stiffness for rotors to be spun at tip speeds exceeding 1000 ft/sec and with temperature approaching or exceeding 1000 degrees F.

Figure 2:
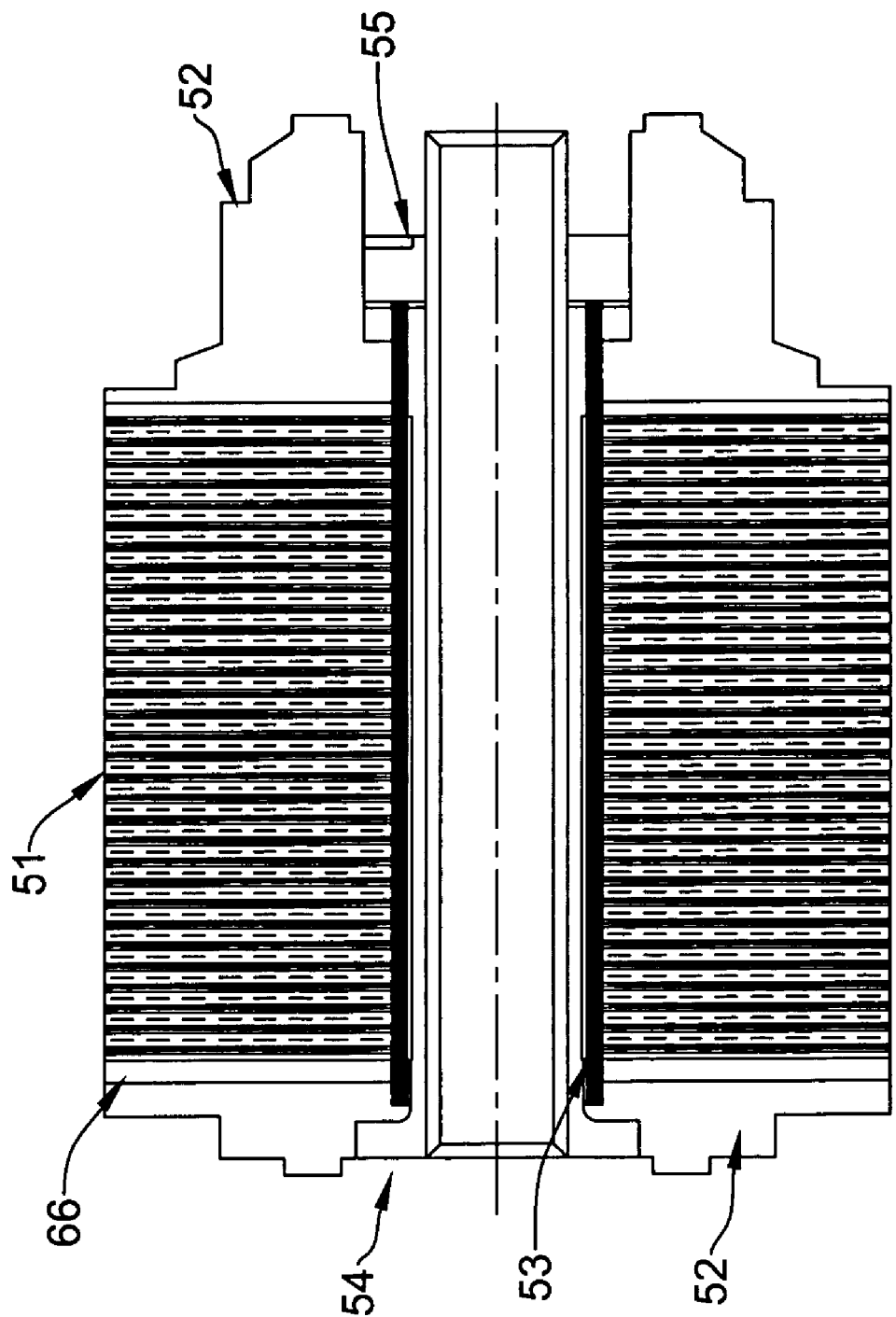
FIG. 2 is an outline diagram of a compressed laminated rotor.
Figure 3:
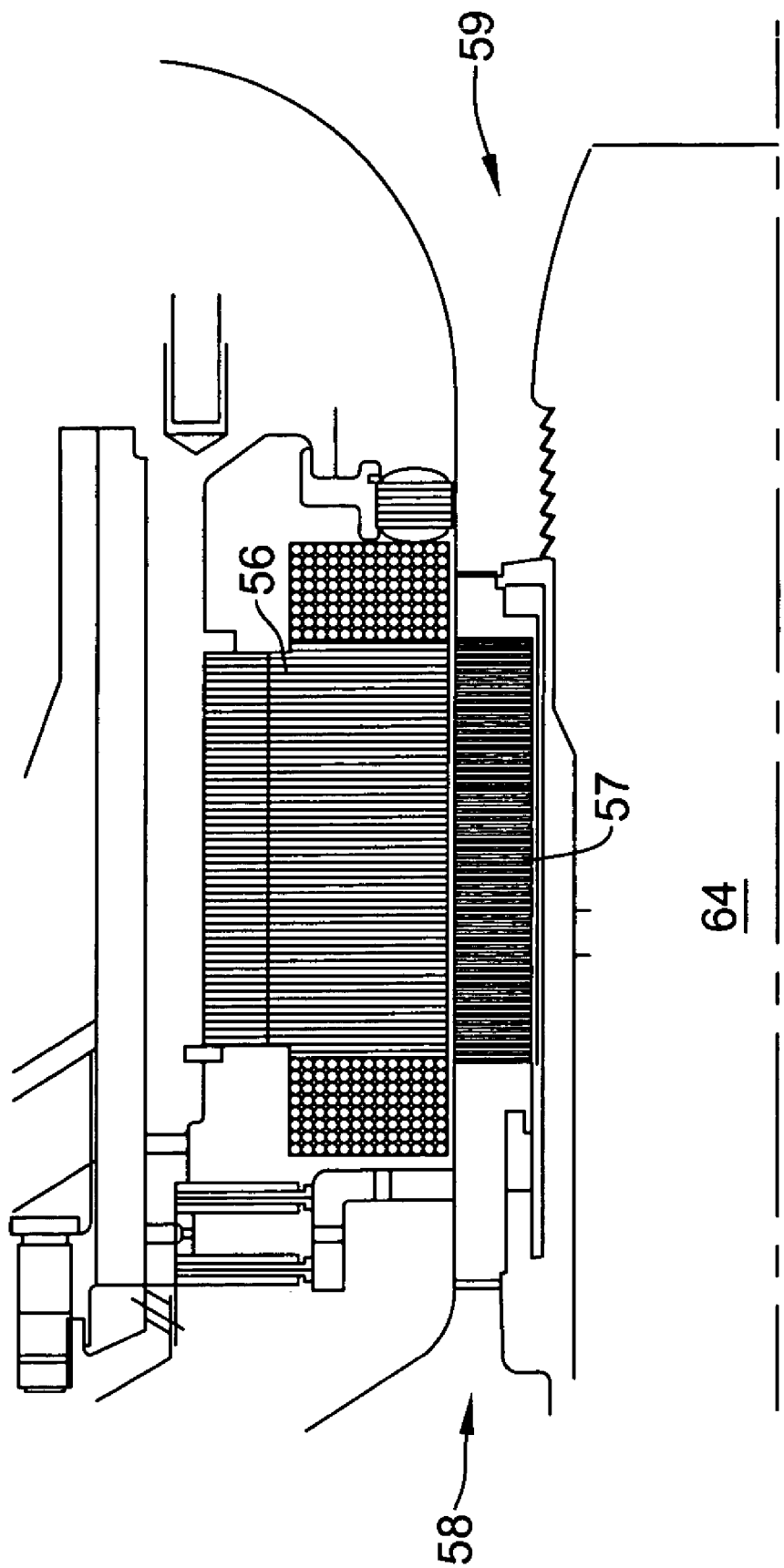
FIG. 3 reveals a magnetic bearing having a rotor with a lamination stack that is separately piloted and clamped and a laminated stator.

For the case of laminated rotors that are compressed to loads approaching or exceeding 4 ksi, one such rotor configuration is shown in FIG. 2. The laminate stack 51 of this rotor configuration may first be compressed between its end caps 52. A pilot shaft 53 may then be inserted into the bore of the laminate 51 and piloted to the end caps 52. A separate tieshaft system (tiebolt 54 and nut 55) may then be inserted and loaded to secure the laminated rotor assembly. Such a laminated rotor assembly may be used for any electrical machine or magnetic bearings. FIG. 3 shows a magnetic bearing 64 having a laminated rotor (journal) 57 with a laminate stack that is separately piloted and clamped and a laminated stator 56. A magnetic bearing 64 may be in the main stack. With an appropriate inter-laminate insulation, this type of rotor may operate at temperatures greater than 1000° F. An application of the rotor of FIG. 3 may involve a compressor 58 and a turbine 59 combination.

For the rotor assemblies shown in FIGS. 1, 2 and 3, the laminates may be glued or bonded together to make the laminate stack easier to handle during assembly and to improve the inter-laminate insulation. For conventional wound rotor generators operating at tip speeds less than 600 ft/sec, it may be common to glue the laminates to make handling of the laminates during assembly easier. These glues do not provide any mechanical strength to the rotor system and have very low temperature capabilities before they burn off.

Adhesive bonding may also be used to assemble a stack of laminates. Adhesive bonding may provide some increase in the overall bending stiffness of the laminate stack; however, it does not possess the mechanical strength of the base materials being bonded. Adhesive bonds are also very limited in at temperatures above 300° F.

In order to achieve high effective bending stiffness, mechanical strength and temperature capabilities, the laminates and associated inter-laminate insulation may be chemically bonded. To optimize the stiffness and strength of a lamination stack, the stack may be chemically bonded with an acceptable dielectric bonding agent and process that insure high strength and stiffness with the required inter-laminate insulation.

Figure 4A:
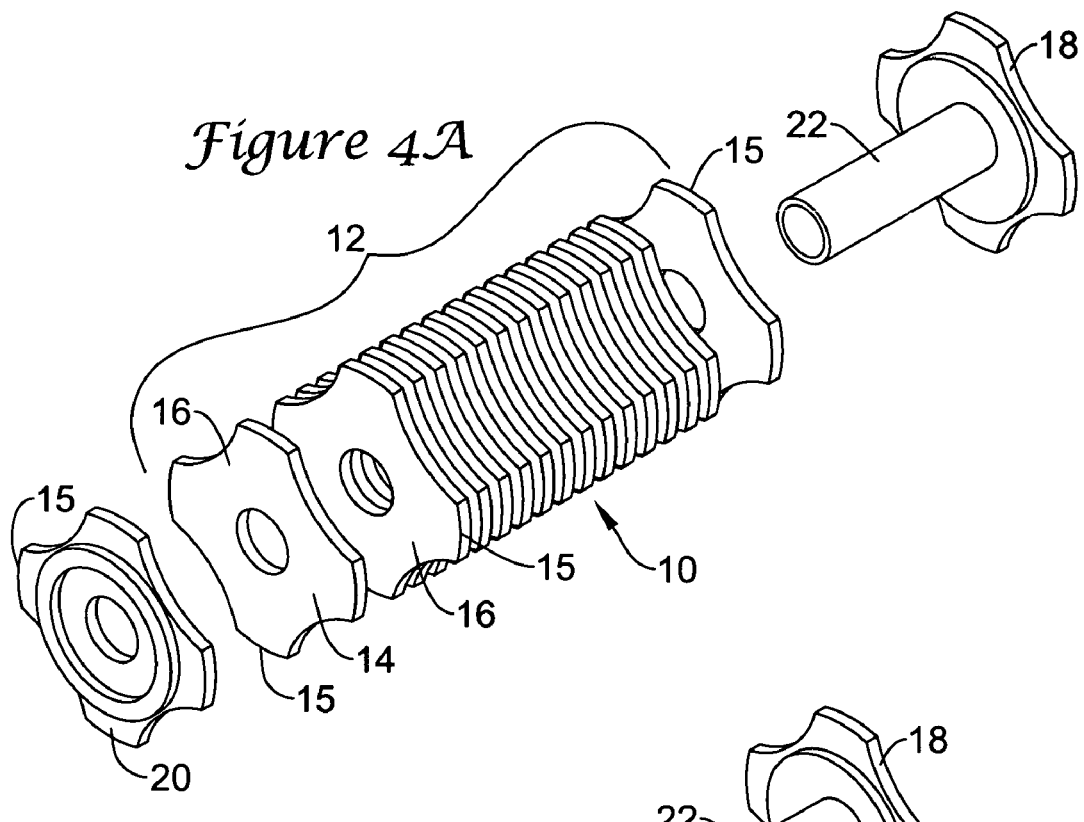
FIG. 4a is an exploded perspective view of a rotor assembly.
Figure 4B:
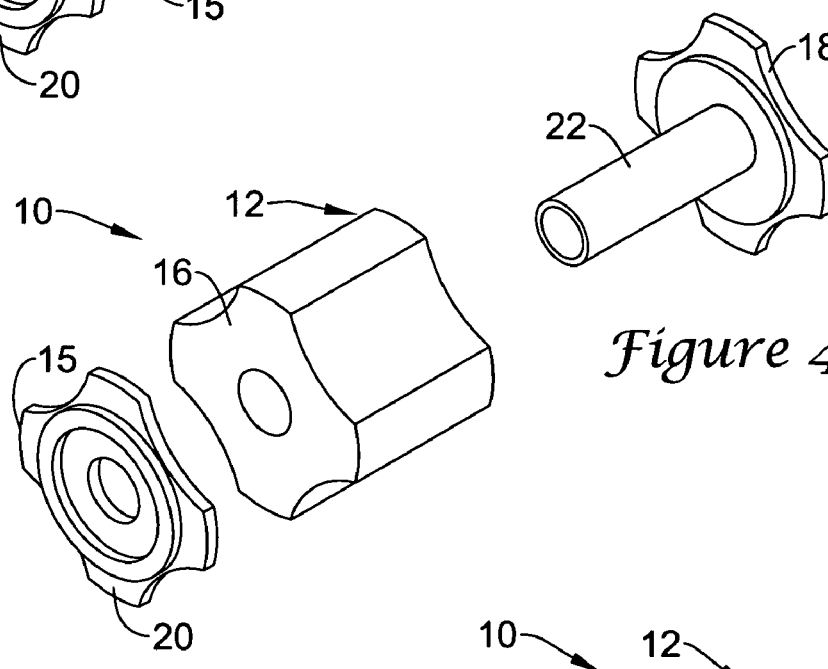
FIG. 4b is a perspective view of the rotor laminations after bonding.
Figure 4C:
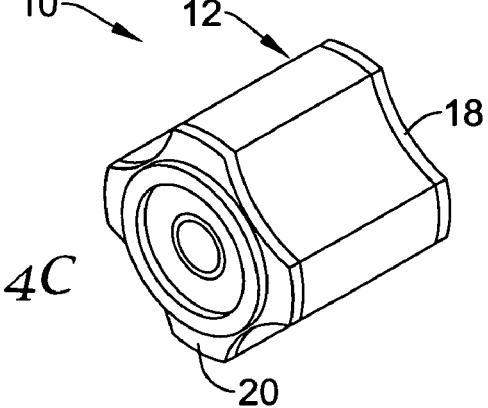
FIG. 4c is a view of the rotor assembly.
Figure 4D:
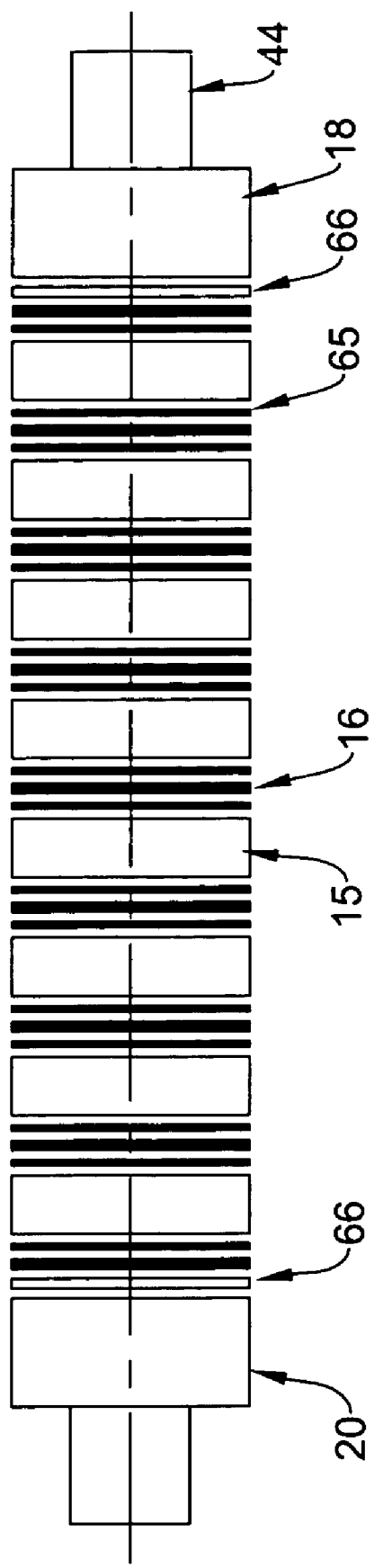
FIG. 4d reveals components of a laminated rotor.

A chemical bonding laminate stack may be used in a laminated rotor assembly, as shown in FIG. 2, or the end caps of the rotor may also be bonded to the laminate stack to form a single rotor. The progression of this technology is shown in FIGS. 4a, 4b and 4c. There may be a progression of a clamped laminated stack to a bonded (chemically) laminate stack, and from the latter to a bonded (chemically) laminated rotor assembly. FIG. 4d shows components of one kind of a laminated rotor assembly 10. It reveals end caps 18 and 20 that with spacers 66 at both ends that enclose the laminates or laminations 15 from the ends together as a rotor assembly 10 on a shaft 44. On the surfaces of each lamination 15 may be a metallic plating, film or interface 65 to provide a basis for adequate chemical bonding if the initial surface of the respective laminate is not sufficient for such bonding. A dielectric bonding agent 16 may be included between laminates 15. These components may be stacked and compressed for a chemical bond process.

FIGS. 4a, 4b and 4c show a rotor assembly 10 including a stack 12 of laminations 14. The laminations 14 can be made of a soft magnetic material such as iron—cobalt or silicon steel. The laminations 14 shown in FIGS. 4a, 4b and 4c may be configured for a switched reluctance machine. In FIGS. 4a and 4b, bonding agent 16 may be applied on each face or the surfaces of the laminates or laminations 14. Stack 12 in FIG. 4c may be regarded as a chemically bonded lamination stack. However, the laminations 14 could be configured for other types of electrical machines, such as inductance machines and wound rotor machines. The laminations 14 may be bonded together by a bonding agent 16.

Bonding agents 16 may include, but not limited to, metallic-oxide compounds such a titanium oxide ($TiO_2$), aluminum oxide ($Al_2O_3$), and the like. Selection of the bonding agent 16 may depend upon factors such as ability to chemically bond to the surface of the laminations 14, the coefficient of thermal and the thermal expansion of the laminate material of the rotor assembly 10. The bonding agents 16 may be used for laminations made of iron—cobalt and silicon steel at operating temperatures of up to and over 1000° F.

Thickness and surface finish of the layers of bonding agent 16 between the laminations 14 may be dependent upon the application for which the rotor assembly 10 is intended. Thick layers having coarse finishes often adhere better to the laminations 14 than thin, polished layers. Moreover, thicker layers may offer better magnetic insulation. However, rotor assemblies having thin, polished layers may have better stacking factors than rotor assemblies having thick, coarse layers. The rotor assemblies having better stacking factors may also have larger diameters and, therefore, larger tip speeds, resulting in a tradeoff, that is, bonding strength and magnetic insulation versus stacking factor and size of the rotor assembly.

The rotor assembly 10 may further include first and second end caps 18 and 20 that are bonded to opposite ends of the lamination stack 12 by the dielectric bonding agent 16. The end caps 18 and 20 may be made of a non-magnetic material. A shaft 22 may extend though a central bore of the lamination stack 12. The lamination stack 12 may be secured to the shaft 22 by an interference fit. In the alternative, the shaft 22 may be bonded to the lamination stack 12 by the bonding agent 16 while the laminations 14 are being bonded together. Each lamination 14 and end caps 18 and 20 may have four poles 15.

Figure 5A:
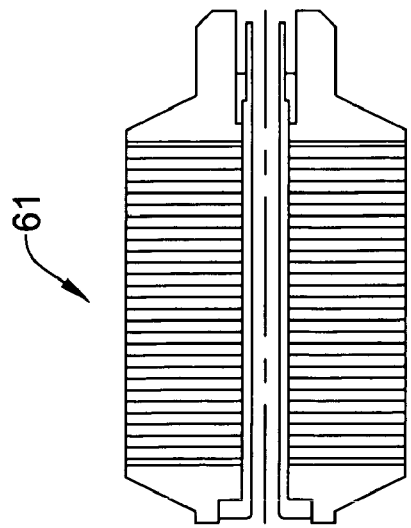
FIGS. 5a, 5b and 5c contain various rotors with chemically bonded laminates.
Figure 5B:
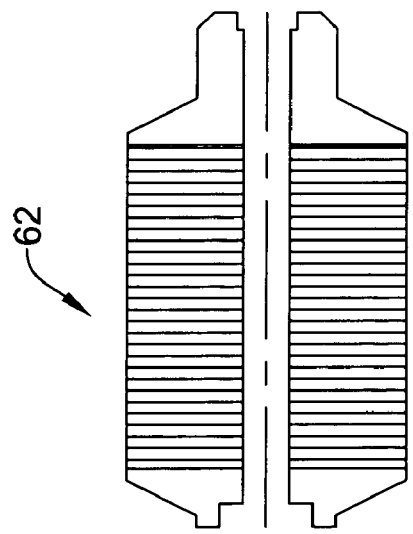
Figure 5C:
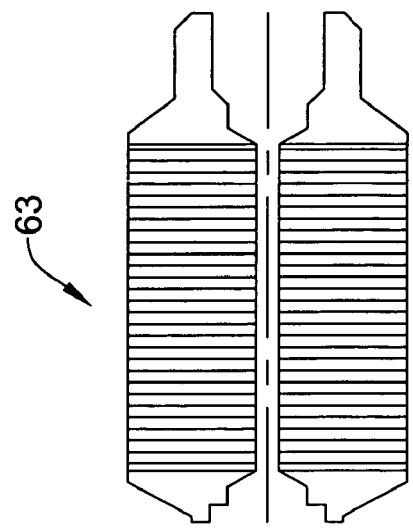

FIGS. 5a, 5b and 5c show different versions of a chemically bonded laminated rotor. FIG. 5a shows a chemically bonded lamination stack that uses a separate shaft for piloting and clamping, as shown in FIG. 2, to form an integrated laminated rotor assembly 61; FIG. 5b shows a bonded lamination assembly 62, where the end caps and pilot shaft are included in the bonded assembly; and FIG. 5c shows a bonded assembly 63, that includes the lamination stack and end caps. A chemically bonded rotor assembly 63 allows for the lamination center hole to be as small as possible to minimize lamination stresses under higher tip speed operation. It also allows the lamination to be directly exposed to a cooling fluid if needed.

Figure 6:
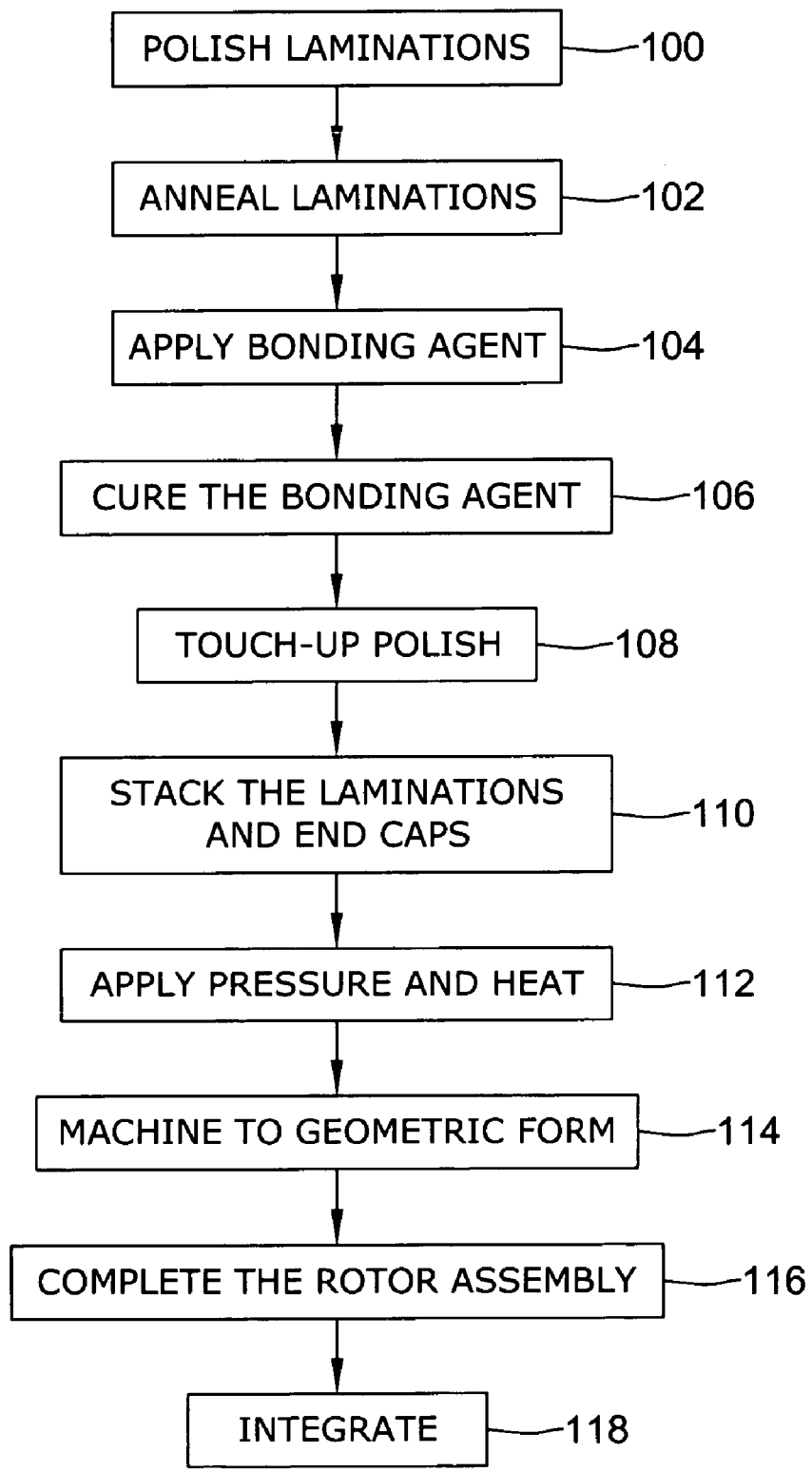
FIG. 6 is a flowchart of a method of fabricating a chemically bonded laminated rotor assembly.

FIG. 6 shows the steps for fabricating the rotor assembly 10. The laminations may be polished to remove rough surfaces (step 100). After the surfaces are polished, the laminations 14 may be annealed (step 102). Annealing may improve the mechanical and magnetic properties of the laminations 14. Next, the bonding agent 16 may be applied (step 104). The entire surfaces (i.e., the radial and axial facing surfaces) of the laminations 14 may be covered with the dielectric bonding agent 16, and end cap surfaces that come into contact with the lamination stack 12 may also be covered with the dielectric bonding agent 16. Layers of the dielectric bonding agent 16 may be applied to the laminations 14 and end caps 20 and 18 by a process such as spin-coating, spraying, rolling and/or dipping. After the bonding agent 16 is applied, it may be cured (step 106). Curing may drive out organic solvents in the bonding agent 16.

If necessary, the layers of the bonding agent 16 may be polished (step 108). Applying the bonding agent 16 by a process such as spin coating might cause a buildup around the edges of the laminations 14. Polishing may remove the buildup. A process such as dip coating, however, might not cause a buildup and, therefore, might not have to be followed by polishing. Next, the laminations 14 and the end caps 16 and 18 may be stacked (step 110). Bringing the laminations 14 into contact may cause a moderately strong bond to be formed between the laminations 14.

Bond strength may be increased greatly by applying a pressure load to the laminations 14 during a predefined thermal cycle (step 112). During the thermal cycle, temperature may be raised from room temperature to a curing temperature. After the bonding agent has been allowed to cure, the temperature may be lowered and the pressure load be removed. Here too, a tradeoff is involved. Lower temperatures over longer curing periods may result in higher strength and better insulation properties. Thus, the tradeoff may be manufacturing speed versus mechanical and insulation properties. Still, higher temperatures over shorter curing periods could still provide a lamination stack 12 having adequate strength and magnetic insulation.

The lamination stack 12 may be machined to geometric form (step 114). Machining after stacking and bonding may be far simpler than the conventional process of precutting geometric figures and then stacking.

The rotor assembly 10 may then be completed (step 116). If the shaft 22 has not already been bonded to the lamination stack 12, then the bonded lamination stack 12 may be secured to the shaft 22 by an interference fit. The rotor assembly 10 may be journalled by bearings, balanced by adding or removing balance material, and checked and corrected for runout. Detailing the rotor assembly 10 may be done more easily and less expensively after assembly than detailing a conventional rotor during various phases of assembly. Detailing after assembly may allow for better quality control of the rotor assembly 10.

Piloting features may be added to the rotor assembly 10. The end caps 18 and 20 may be provided with piloting features that engage piloting features of other components of a turbomachine. The piloting features may include curvex, axial face and radial diameter, or other such features.

The resultant component may be integrated into an electrical machine or the rotating group of a turbomachine (step 118). The rotor assembly 10 may be used as a starter/generator capable of high-speed and high-temperature operation in a turbomachine such as an auxiliary power unit (APU) or an integrated power unit (IPU). However, usage of the rotor assembly 10 need not be limited to such turbomachines. The rotor assembly 10 may also be used in small, low-speed, low-temperature motors for products such as household appliances.

Figure 7:
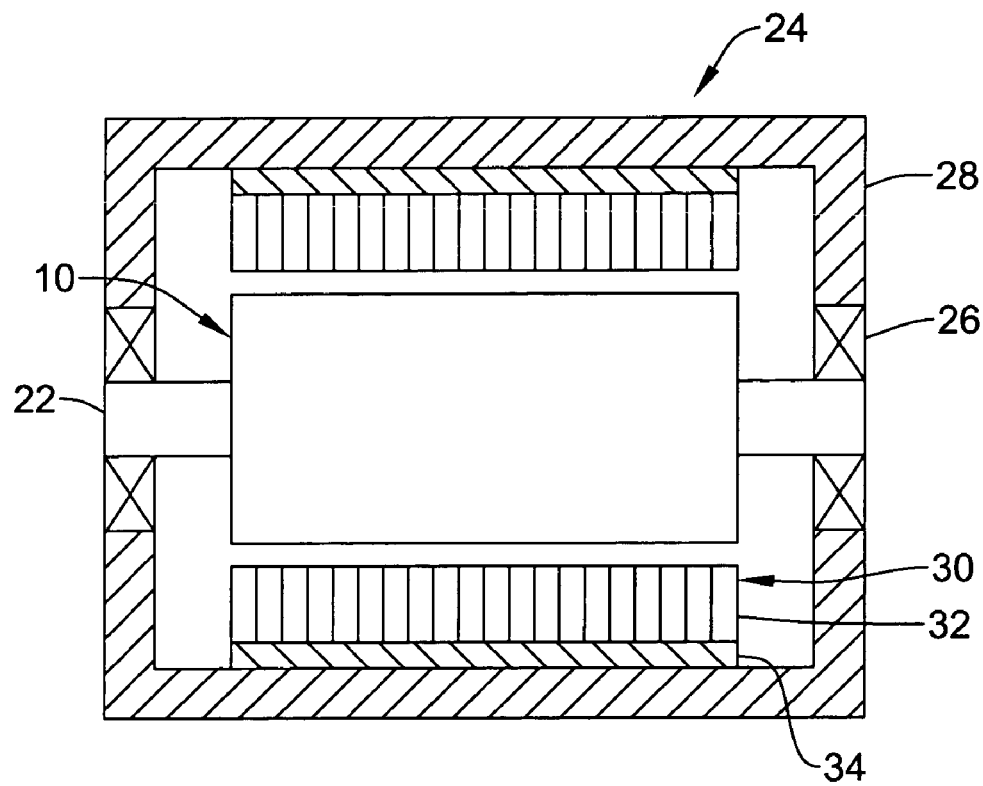
FIG. 7 is a schematic diagram of an electrical machine including a rotor assembly.

FIG. 7 shows a rotor assembly 10 that may be integrated into an electrical machine 24. The rotor assembly 10 may be supported by bearings 26 within a housing 28. A stator assembly 30 may be mounted to the housing 28. The stator assembly 30 may include a stack 32 of laminations surrounding the rotor assembly 10 and a retainer sleeve 34 surrounding the lamination stack 32. The retainer sleeve 34 and the laminations of the stack 32 may be bonded together as described above.

Figure 8:
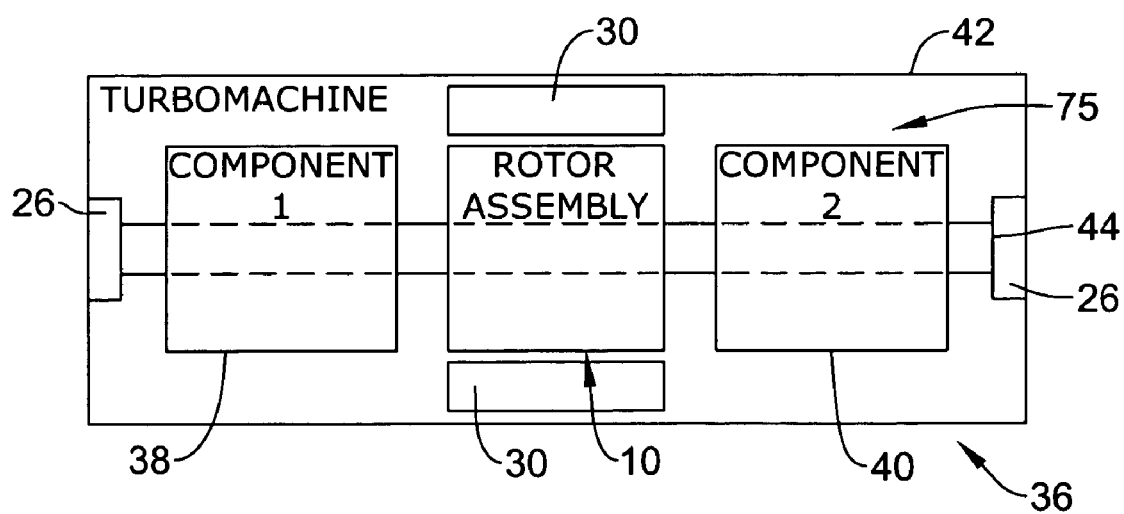
FIG. 8 is a block diagram of a turbomachine including a laminated rotor assembly.

FIG. 8 shows a rotor assembly 10 that is integrated into the rotating group of a turbomachine 36. The rotating group may also include a first component 38 such as a turbine wheel assembly, a second component 40 such as a compressor wheel assembly, and a housing 42. The rotor assembly 10 and the first and second components 38 and 40 may be stacked together, with piloting features on the end caps 18 and 20 of the rotor assembly 10 mating with piloting features on the first and second components 38 and 40. The rotor assembly 10 and the first and second components 38 and 40 may be secured together by a group tieshaft 44 to form the turbomachine shaft 75. The turbomachine shaft 75 may be supported by bearings 26 which may be magnetic bearings, foil bearings and/or lubricated bearings. Both the stator 30 and the rotor 10 may have a chemically bonded laminated structure.

Thus disclosed is a laminated rotor assembly 10 that achieves high stiffness by bonding. Bonding instead of clamping reduces core and insulation losses. Bonding instead of clamping also eliminates the tieshaft. Eliminating the tieshaft increases cooling efficiency and reduces overall length of the electrical machine. Bonding may also eliminate the need for a pilot shaft. This, in turn, may further increase cooling efficiency, since a cooling fluid can be brought into direct contact with the laminations 14.

Figure 9:
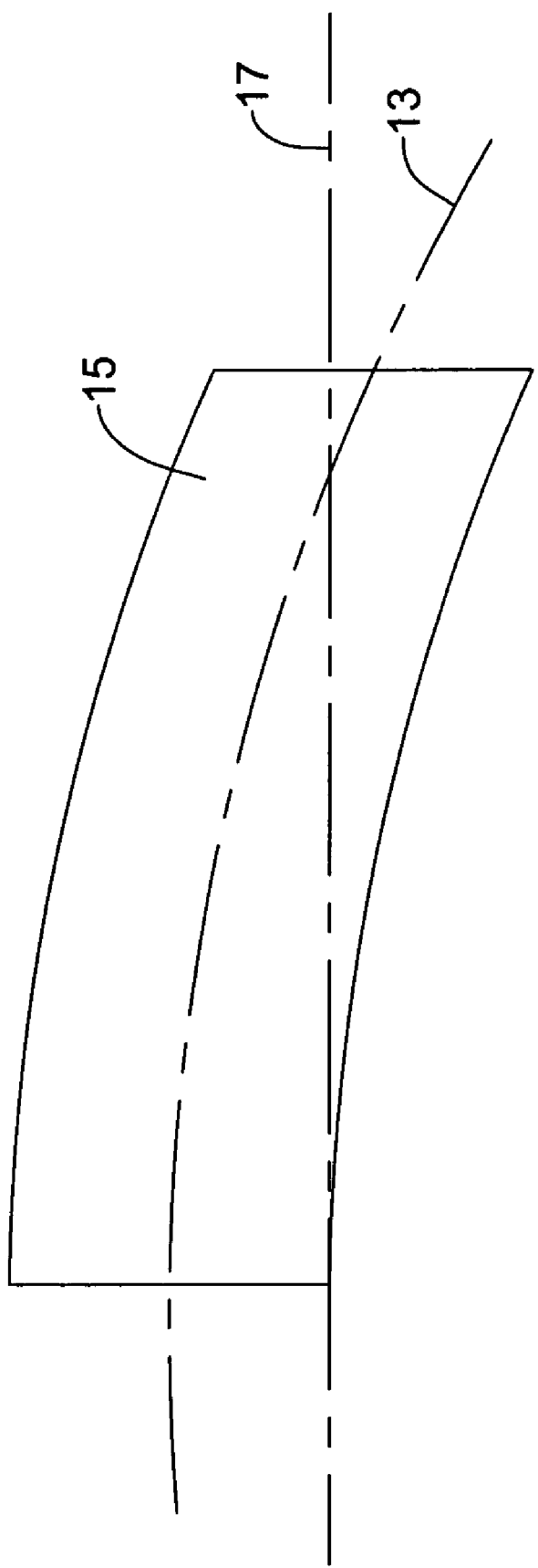
FIG. 9 is a schematical top view of a rotor assembly having offset rotor poles.

The bonded laminations 14 may also offer superior mechanical and dynamic characteristics over unbonded, unclamped laminations. Bonded laminations 14 have higher stiffness, which reduces rotor deflections. Bonded laminations 14 are less likely to shift and produce vibrations that could damage the electrical machine. Additionally, bonding may allow some of the poles of the laminations to be offset. Referring to FIG. 9, offset means that the centerline 13 of the poles 15 is different from the centerline 17 of the rotor assembly 10. Offsetting some of the poles may allow for cooling flow to be optimized along the poles and windage losses to be minimized.

Bonding may also improve the manufacturability and reliability of the rotor assembly 10. The chemical bonding agent 16 may make it easier to assemble loose laminations. Bonded laminations do not have relative motion between them, thereby reducing the potential for wear of the inter-laminate insulation. Such wear may result in inter-lamination shorting. Unlike glue, the chemical bonding agent 16 contributes to the strength and stiffness of the laminations 14. Additionally, the dielectric bonding agent 16 does not have the inherent temperature limitations of glue. Whereas the glue limits a rotor assembly to low temperature operation, the dielectric bonding agent 16 may allow the rotor assembly 10 to run at high operating temperatures.

The mechanical properties of the discussed rotor assembly vary based on the assembly and bonding technique, as well as the inter-laminate insulation used. For high-speed turbomachinery application, the primary mechanical properties of interest may be effective bending stiffness of the laminates, the rotor strength (i.e., laminates and support shaft), tip speed capability of the rotor (the higher the tip speed, the shorter the rotor), and temperature capability.

For the rotor assemblies shown in FIGS. 1, 3, 4a, 4b, 4c, 4d, 5a, 5b and 5c, the effective stiffness of the laminate stack may be approximately the values noted in the following. For a lightly clamped laminate stack, the bending stiffness, as related to an effective Young's Modulus (E), may be less than 10 percent of the base material (base material E is about 30 mPSI). For a clamped laminate stack with a load of about 4 KSI and no bonding, the bending stiffness (effective E) is about 5 to 10 mPSI. For adhesive Bonding, the effective E is about 5 to 15 mPSI (depending on clamp load). For a laminate stack joined by chemical bonding, the effective E is about 20 to 30 mPSI (i.e., it approaches the base material Young's modulus). Compared to all of the other versions of making rotor assemblies, the chemical bonds approach the strength of the base material. All of the other processes and methods rely on the support shaft for shear load reaction.

The greatest potential tip speed that can be achieved would be for a laminate stack that is chemically bonded. This is due to the ability of the laminate stack to have the smallest (if any) inner-bore. The smaller the inner-bore, the greater is the potential tip speed All of the other assemblies, due to the shafts required to support the laminate stack, increase the laminated inner-bore diameter, which increases in the laminate bore stresses for a fixed tip speed, thereby resulting in a lower maximum sustainable fixed tip speed of the laminate stack.

In relation to temperature capability, a chemical bond has the greatest potential temperature limit. Chemical bonds may be created at or above 1000° F. Chemical bonds are capable of being operating at temperatures near where the bond is formed. It is feasible to bond a laminate stack at 1500° F. or higher, resulting in a laminated rotor that may operate at a temperature greater than 1000° F.

The processes of chemical bonding of a lamination stack may be of particular interest for laminated rotors used in electrical machines. However, these processes may be applied to laminated stacks/assemblies used in magnetic bearings, recording equipment, and laminated stators as well.

A primary process of concern may be a chemical bonding of the inter-laminate insulation (dielectric material) to the laminate or an associated interface. This may be the bonding of metallic oxide, resulting in an ionic bond (a type of chemical bond). However, other bonds, such as metallic bonds may occur during the process.

There may be some confusion about various kinds of bonding since the term such as "chemical bonding" has often been misused in the related art. Some kinds of bonding may pertain to glue, resins, epoxies, adhesives, and like materials for sticking laminations together. These may be regarded as "chemical bonding" in a broad sense of the meaning. These materials that are used for bonding cannot result in a true chemical bond. In the present description, bonding of laminations together with an appropriate bonding agent may result in a "chemical bonding" of the laminations. The general categories of chemical bonding may include metallic bonding, ionic bonding and covalent bonding. In the present invention, lamination bonding may involve a mix of ionic and covalent bonding and end cap bonding may involve metallic bonding.

The chemical bonding of laminates may result in a rotor that is much stronger, mechanically and thermally, than one using adhesives, epoxies or the like. There may be Young's modulus results of tests performed on various materials used in rotors. The metal of the laminations, i.e., iron-cobalt, may have a Young's modulus of about $30 \times 10^6$ PSI. Stacks of laminates that are secured with glues, epoxies and adhesives have a modulus varying between about $2 \times 10^6$ and $10 \times 10^6$ PSI, depending on the amount of temperature and pressure applied to the laminations. If the pressure and temperature of these glues, epoxies and adhesives were increased to achieve a greater modulus, then local shorting would occur between the laminations. Addition of an axial load to the lamination stack might increase the effective Young's Modulus to 15 mPSI.

The Young's modulus of a stack of laminates when chemically bonded may range from about $20 \times 10^6$ to $30 \times 10^6$ PSI, up to a magnitude better than that of glue and nearly as good as that of the metal of the laminates being bonded, such as iron-cobalt. Thus, the advantages of chemical bonding in the present invention include significant structural rigidity and stiffness provided to motor components, particularly moving parts, such as laminated rotors. This is important for high-speed rotors in order to avoid destructive vibratory response due to rotating unbalance.

Chemical bonding agents may typically be metallic oxide compounds which can induce a chemical reaction at the interface with another similar compound during bonding. Adhesive bonding agents are typically resins which do not induce a chemical reaction at the interface during bonding, e.g., epoxy resins. Chemical bonding is a result of chemical reaction between two substances in which atoms from either side may penetrate through the interface in both directions. Thus, there is a sharing of electrons between the two substances and valencies can change. Adhesive bonding is a result of adsorption of bonding molecules on the two mating surfaces. There is no sharing of electrons or change of valencies. Chemical bonding will not degrade with increase in temperature as the bonded compound is stable to a very high temperature. A chemical bond may be good for temperatures in the 1000 to 1500 degree F. range, or greater, depending on when phase changes occur in the bond. The thermal cycle temperature for effecting the ("chemical") bond may range from about 1500 to 1800 degrees F (816 to 982 degrees C).

On the other hand, an adhesive bond will degrade with temperature and finally burn into gases at a relatively lower temperature. An adhesive bond generally may be good up to 300 degrees F, and more rarely may be good up to as high as 600 degrees F.

The chemical bonding agent may be naturally matched in thermal expansion to the laminates being bonded. Hence, an increase in temperature of the assembly does not produce stresses in the bond. The adhesive bonding agent is not naturally matched in thermal expansion to the laminates being bonded, so the thermal coefficients of the agent and the laminates need to be carefully matched for an effective adhesive bond of the laminates, albeit a lower temperature and weaker bond than a chemical bond.

Several processes for chemically bonding a laminate stack may be utilized. One process 120 may be a chemical bonding of a laminate stack with dielectric bonding agent, as shown in a flow diagram of FIG. 10. Another process 130 may be a chemical bonding of a laminate stack with a metallic interface, i.e., metallic plating, to improve bonding with the dielectric agent, as shown in a flow diagram of FIG. 11. A third process 140 may be a chemical bonding of a laminate stack with a metallic interface to serve as the dielectric agent, as shown in a flow diagram of FIG. 12.

Figure 10:
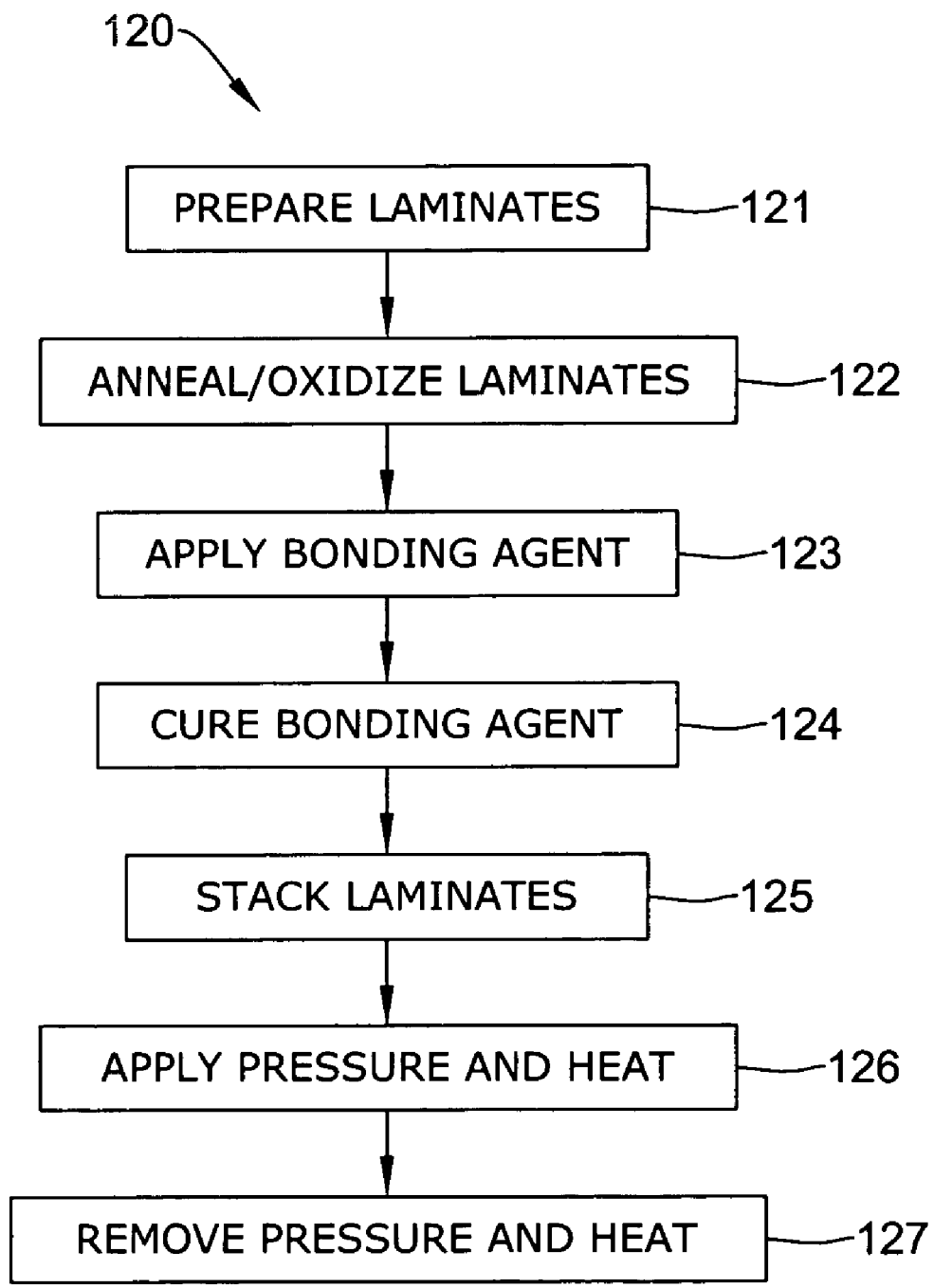
FIGS. 10, 11 and 12 show several processes for chemically bonding a laminate stack.

With the process 120 in FIG. 10, one may start with the preparation of the laminates (step 121). Then, the laminates may be annealed/oxidized (step 122). A bonding agent may be applied to the laminates (step 123) and then the bonding agent may be cured (step 124). The laminates with the cured bonding agent may be stacked (step 125). Pressure and heat may be applied to the stacked laminates (step 126) for a certain period of time at a specified pressure and temperature. After expiration of the certain period of time, the pressure and heat may be removed from the stack of laminates (step 127).

Figure 11:
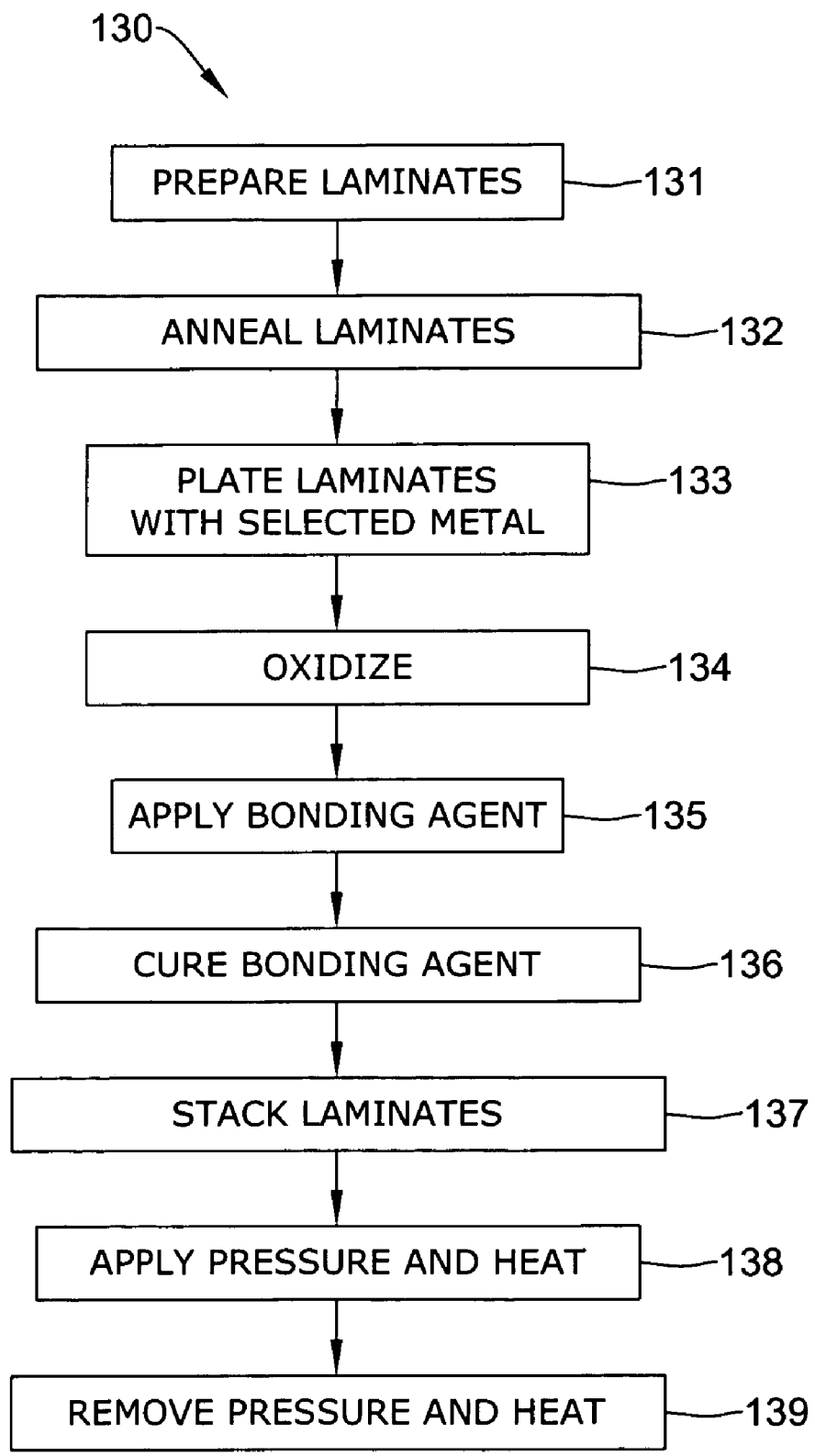

With the process 130 in FIG. 11, one may start with the preparation of the laminates (step 131). Then, the laminates may be annealed (step 132) and oxidized (step 134). A bonding agent may be applied to the laminates (step 135) and then the bonding agent may be cured (step 136). The laminates with the cured bonding agent may be stacked (step 137). Pressure and heat may be applied to the stacked laminates (step 138) for a certain period of time at a specified pressure and temperature. After expiration of the certain period of time, the pressure and heat may be removed from the stack of laminates (step 139).

Figure 12:
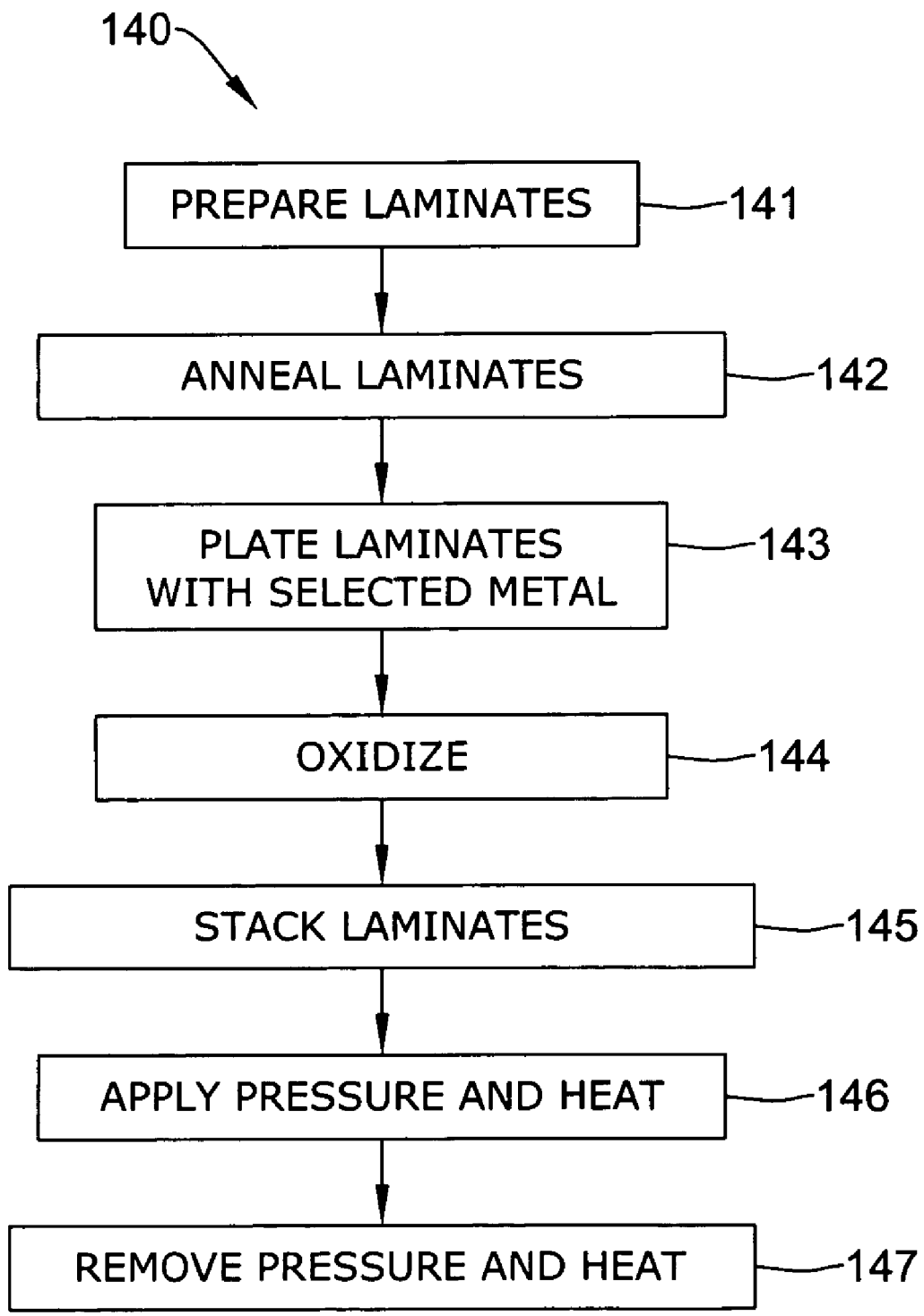

With the process 140 in FIG. 12, one may start with the preparation of the laminates (step 141). Then, the plates may be annealed (step 142). The laminates may be plated with a selected metal (step 143). The plated laminates may be oxidized (step 144). The oxidized plated laminates may be stacked (step 145). Pressure and heat may be applied to the stacked laminates for a certain period of time at a specified pressure and temperature (step 146). After expiration of the certain period of time, the pressure and heat may be removed from the stack of laminates (step 147).

The processes 120, 130 and 140 are illustrative examples. Dielectric agents may consist of, but not limited to, glass, silicon and oxidized nitrides of silicon. Metallic interfaces may consist of titanium, magnesium and inconil, as well as other metals.

Figure 13:
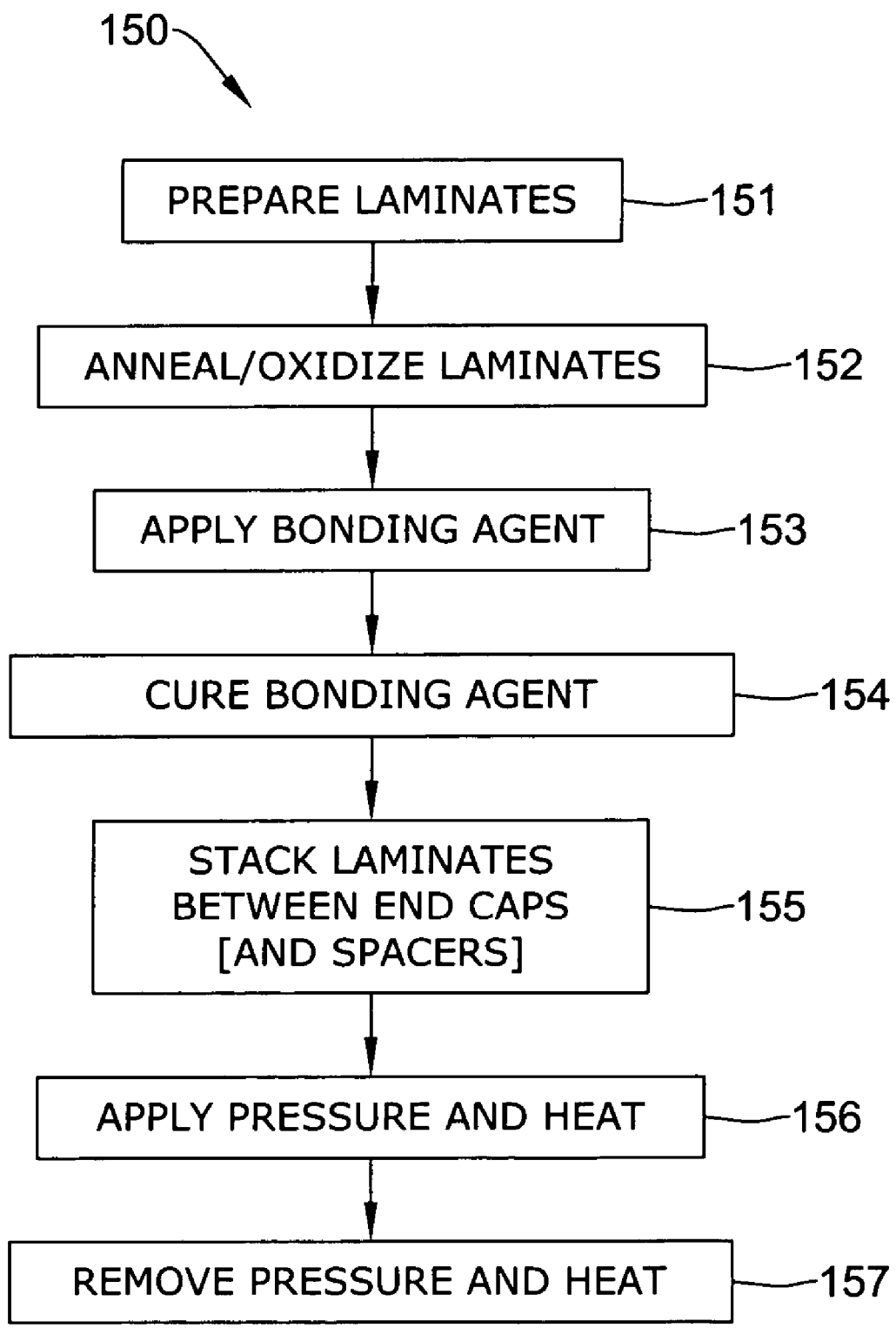
FIG. 13 reveals a process for forming a rotor assembly by including the rotor end caps with the laminate stack chemical bonding process.

The processes 120, 130 and/or 140 may be augmented as a process 150 to form the rotor assembly by including the rotor end caps in the bonding process, i.e., the chemical bonding of a laminated rotor assembly, as shown in a flow diagram of FIG. 13. Process 150 may begin with the preparation of the laminates (step 151). Then, the laminates may be annealed/oxidized (step 152). A bonding agent may be applied to the laminates (step 153). The bonding on the laminates may be cured (step 154). The laminates with the cured bonding agent may be stacked between end caps (and spacers) (step 155). Pressure and heat may be applied to the end caps and the stacked laminates for a certain period of time at a specified pressure and temperature (step 156). After expiration of the certain period of time, the pressure and heat may be removed from the end caps and the stack of laminates (step 157).

A method of chemical bonding of laminations may include an application of heat and pressure to a metallic oxide to a dielectric material to form an ionic bond. This may be accomplished by a number of methods in regard to soft magnetic laminations.

A basic method 120, as shown in FIG. 10, may include forming an oxidation layer on each side of the soft magnetic lamination and applying the dielectric material between each lamination. The assembly may then be bonded when heat and pressure are applied.

Oxidation of a magnetic lamination may result in degradation of magnetic properties of the lamination; or in some cases, the oxidized lamination might not form an adequate bond with the dialectic bonding agent. For these cases, a metallic interface may be applied to the lamination, as shown in FIG. 11 (130) and FIG. 12 (140). By application of a metallic film (plate) to the soft magnetic material prior to the oxidation process, the soft magnetic material may form a normal metallic bond with the metallic film and not be oxidized.

The metallic plate film on each laminate once oxidized may then be stacked together, and when heat and pressure is applied, it may form an ionic bond. This may be suitable for some applications, depending on magnetic performance requirements. As with the basic process, once the metallic film is applied and oxidized, a dielectric bonding agent may be applied to the metallic film prior to the application of heat and pressure.

When using a dielectric bonding agent, the agent may contain fiber spacer filler if needed to prevent inter-laminate contact during the application of high-temperatures and pressures during the bonding process or the actual operational environment.

Materials applicable to chemical bonding of laminations may apply to the general class of soft magnetic materials. This class may include, but is not limited to, iron and low carbon grade steels, silicon steels (non-orientated and orientated), iron-nickel alloys and iron-cobalt alloys. The actual selection of an alloy to use may be based on performance requirements (magnetic characteristics), operational environment (speed and temperature) and mechanical strength.

Pure iron may be commercially available and have high saturation induction; however, it may have low mechanical strength and limited applications. Silicon steels may contain 0.5 to 3.5 percent silicon. Commercial grades as specified by AISI may include M-47, M-46 and M15. These steels may be used in a wide variety of electromagnetic devices, including rotating rotors in high-efficiency machines due to low cost and ease of manufacturing. Silicon steels may be produced to have good mechanical strength and moderate temperature usage (<1000 degrees F).

The soft magnetic materials for high-temperature high-strength applications may consist of the iron-cobalt alloys. These may contain about 49 percent cobalt. For higher strength applications, these alloys may contain vanadium, niobium and/or tantalum. Some trade names for iron-cobalt alloys may include 2V Permendur, Hiperco Alloy 50, HS50 and Supermendur.

An agent in chemical bonding of the laminates may be a dielectric material. Materials that may be used for chemical bonding that are dielectric can include, but not limited to, glass and silicates, hafnium oxide, ZrO2 (zirconia oxide), alumina, MgO (magnesium oxide), and TiO2 (titanium oxide). These materials may be processed in various fashions for application to laminate or laminate interfaces (plating).

Materials used to plate the soft magnetic lamination prior to oxidation may consist of, but not limited to, nickel, aluminum, titanium and hafnium. These, as well as other materials, may be applied and processed in a variety of methods. These may even be used as the dielectric interface, depending upon the magnetic properties required of the rotatable assembly.

A process for the chemical bonding of a lamination (120, 130 & 140) may include preparation of the lamination, annealing of the lamination, application of metallic interface if needed, oxidization of surfaces to be bonded, application of dielectric bonding agent, curing and stacking the laminations, and bonding the stack with the application of heat and pressure. Each one of these steps may contain multiple steps. The preparation of the lamination may include cutting the lamination to the appropriate size, cleaning the lamination and polishing the lamination as desired.

Annealing (122, 132, 142) of the lamination may consist of one or more steps. The first step may be to anneal the lamination in an inert gas to remove carbon from the lamination and any other impurities that might be on the laminations. For silicon steel, it may be recommended that the laminations be annealed in a moist hydrogen environment at about 1520 degrees F for about an hour. Iron-Ni alloys may be annealed at 1830 to 2200 degrees F for several hours to remove impurities. The laminations might also require a stress-relief heat treat process. This may at some times be accomplished with the initial annealing to remove impurities.

Annealing may then be performed to achieve the proper magnetic and mechanical properties. Superior magnetic properties may be achieved with large grain size. Large grain size may be achieved with a high annealing temperature.

Superior mechanical properties may be achieved with small grain sizes. Small grain sizes may result from low annealing temperatures. These may have to be traded off during the design stages to optimize the machine.

Provided are examples of the effects of heat treatment on magnetic and mechanical properties of a typical iron-cobalt alloy: 1) Heat treat temperature ~1328 degrees F for about 1 hour, yield ~99 ksi, flux density at about 10 Oe ~1.82 T, losses at 400 Hz of about 20,000 kgauss, losses ~150 watts/kilogram; 2) Heat treat temperature ~1364 degrees F for about 1 hour, yield ~86 ksi, flux density at about 10 Oe ~1.90 T, losses at 400 Hz of about 20,000 kgauss, losses ~110 watts/kilogram; and 3) Heat treat temperature ~1400 degrees F for about 4 hours, yield ~73 ksi, flux density at about 10 Oe ~1.93 T, losses at 400 Hz at about 20,000 kgauss, losses ~95 watts/kilogram.

Heat treating temperatures and times may vary with materials. Silicon steels may be heat treated to temperatures above 2000 degrees F for an hour or more. Iron-Ni alloys such as Permeability 49 may be annealed at 1300 to 1400 degrees F for 1 to 2 hours, whereas other iron-Ni alloys may be heat treated at 1800 to 2200 degrees F for several hours in pure dry hydrogen.

Once annealed, the lamination may be plated with a metallic interface (133, 143), if needed. This may be achieved by the application of the selected metal electroless plating, electrolytic plating, sputtering or splate coating. Other methods may also be available. When a dielectric bonding agent is going to be used, the metallic interface may be applied in a thickness in the range of 0.00001 inch to 0.001 inch.

The next step in the process may be to oxidize the surface to be bonded (122, 134, 144). This may be achieved by heating the lamination to 900 degrees F or higher, while exposed to air. For many applications, this step may be incorporated into the annealing process if a metallic interface is not going to be used.

Once oxidized, a dielectric bonding agent may be applied (123, 135). Selected materials may be applied in a variety of forms and processes. For an illustrative example, they may be applied as a glass or SolGel™. Application methods may include spin-on, dipping, sputtering, spraying, rolling, dipping or screen printing. A compound may also use filler fibers to insure that the bonding agent does not allow inter-laminate contact during the bonding process or actual operation. Chemical vapor deposition or physical vapor deposition may be used to apply filler fibers or the fibers may be contained in the SolGel™ or glass.

Stacking factors for laminated rotors may be greater than 90 percent. That is to say that the ratio of laminate material to insulation may be on the order of 10 to 1. For a 7 mil laminate (0.007"), the applied coating may be less than 0.7 mils (0.0007"). The applied thickness may vary based on the actual performance and size requirements of the laminated rotor assembly.

The final step may be the bonding the laminations (126, 138, 146). The laminations may be stacked and cured. Part of the curing process may be a burnout stage which can include the removal of organic compounds, which might be present, and all other impurities in the compound such as carbon, that may result in degraded electrical performance of the coating. Pressure and heat may then be applied to the stack for a specified period of time. The pressure and temperature may then be removed.

The curing process and bonding process may depend upon the materials being used, the annealing temperature for the laminations and the desired magnetic and mechanical properties.

An illustrative example of a medium temperature usage of an iron-cobalt material may consist of heating the stack to 500 degrees F to soften the dielectric bonding agent binder. While at 500 degrees F, an initial application of about 500 psi loading may occur to insure uniform thickness of the dielectric bonding agent. The load may then be reduced and the stack may be subjected to a burn-out or curing cycle. The temperature may then be increased to about 900 degrees F and the pressure to about 4 ksi. This may be held until the bonding process is complete in ~4 hours. This particular example may provide a chemical bond that is good to 850 degrees F.

For a higher temperature requirement, the bonding temperature may be increased such that the maximum expected operational temperature is less than the bonding temperature. The applied pressure may also depend on the intended operational load. For example, for an expected operating temperature of 1100 degrees F where mechanical strength is important, one may anneal an iron-cobalt alloy at about 1328 degrees F for about one hour. The laminations may then be oxidized and the dielectric bonding agent applied. The bonding temperature may be set at 1200 degrees F and a pressure in the range of 2 ksi to 20 ksi may be applied to the stack. This may be maintained for 2 to 8 hours.

The above may apply to the process of chemically bonding a lamination stack. The presently bonded stack may be incorporated into a rotor assembly. This may be done using a process as shown in FIG. 1 or 2. It may also be accomplished by bonding the lamination stack with rotor components as shown in FIG. 5c. This process (150) is shown in FIG. 6.

Although the invention has been described with respect to at least one illustrative embodiment, many variations and modifications will become apparent to those skilled in the art upon reading the present specification. It is therefore the intention that the appended claims be interpreted as broadly as possible in view of the prior art to include all such variations and modifications.

What is claimed is:

1. A rotatable assembly for a machine, comprising:
    a stack of laminations, each lamination formed from a material; and
    a chemical bonding agent disposed over axial facing surfaces of each of the laminations, the laminations being bonded together by the chemical bonding agent such that the laminations maintain a bond at operating temperatures over 1000 degrees Fahrenheit.

2. The assembly of claim 1, wherein the chemical bonding agent is selected from a group consisting of glass, metallic-oxides, silicates and nitrides of silicon.

3. The assembly of claim 1, wherein the chemical bonding agent is a material having a low dielectric constant.

4. The assembly of claim 1, wherein the material is a soft magnetic material.

5. The assembly of claim 4, wherein the soft magnetic material is iron-cobalt.

6. The assembly of claim 4, wherein the soft magnetic material is silicon steel.

7. The assembly of claim 1, wherein the laminations and the chemical bonding agent have matching coefficients of thermal expansion.

8. The assembly of claim 1, the chemical bonding agent provides magnetic insulation between the bonded laminations.

9. The assembly of claim 1, further comprising a metallic layer on the surfaces of each of the laminations.

10. The assembly of claim 9, wherein the metallic layer is an interface to protect lamination from oxidation and to chemically bond with the dielectric bonding agent.

11. The assembly of claim 1, further comprising:
first and second end caps bonded to the laminations by the chemical bonding agent; and
a shaft bonded by the chemical bonding agent to a bore defined by the laminations.

12. A machine comprising:
a housing;
a stator assembly mounted to the housing; and
a rotor assembly including a shaft, a stack of laminations mounted to the shaft, each lamination formed from a material; and a chemical bonding agent disposed over axial facing surfaces of each of the laminations, the laminations being bonded together by the chemical bonding agent, such that the laminations maintain a bond in operating temperatures over 1000 degrees Fahrenheit, the shaft being bonded to the stack of laminations by the chemical bonding agent.

13. The machine of claim 12, wherein the chemical bonding agent is selected from a group consisting of glass, metallic-oxides, silicates, and nitrides of silicon.

14. The machine of claim 12, wherein the chemical bonding agent is a material having a low dielectric constant.

15. The machine of claim 12, wherein the material is a soft magnetic material.

16. The machine of claim 15, wherein the soft magnetic material is iron-cobalt.

17. The machine of claim 15, wherein the soft magnetic material is silicon steel.

18. The machine of claim 12, wherein the laminations and the chemical bonding agent have matching coefficients of thermal expansion.

19. The machine of claim 12, wherein the bonding agent provides magnetic insulation between the laminations.

20. The machine of claim 12, further comprising:
first and second end caps bonded to the laminations by the chemical bonding agent; and
a plurality of bearings for supporting the rotor assembly within the housing.

21. A rotor assembly for a machine, comprising:
a stack of laminations, each lamination formed from a material; and
a chemical bonding agent disposed over axial facing surfaces of each of the laminations, the laminations being bonded together by the chemical bonding agent, such that the laminations maintain a bond in operating temperatures up to 1000 degrees Fahrenheit, and the laminations and the chemical bonding agent having substantially matching coefficients of thermal expansion, the bonding agent providing magnetic insulation between the bonded laminations.

22. The assembly of claim 21, wherein the chemical bonding agent is selected from a group consisting of metallic oxides, glass, silicates, and nitrides of silicon.

23. The assembly of claim 21, wherein the chemical bonding agent is a material having a low dielectric constant.

24. The assembly of claim 21, wherein the material is a soft magnetic material.

25. The assembly of claim 24 wherein the soft magnetic material is iron-cobalt.

26. The assembly of claim 24, wherein the soft magnetic material is silicon steel.

27. The assembly of claim 21, further comprising:
first and second end caps bonded to the laminations by the chemical bonding agent; and a shaft bonded by the chemical bonding agent to a bore defined by the laminations.

28. A machine comprising:
a housing;
a stator assembly mounted to the housing; and
a rotor assembly including a shaft, a stack of laminations mounted to the shaft, each lamination formed from a soft magnetic material; and a chemical bonding agent disposed over axial facing surfaces of each of the laminations, the laminations being bonded together by the chemical bonding agent, such that the laminations maintain a bond in operating temperatures up to 1000 degrees Fahrenheit, and the laminations and the chemical bonding agent having matching coefficients of thermal expansion, the shaft being bonded to the stack of laminations by the chemical bonding agent.

29. The machine of claim 28, wherein the chemical bonding agent is selected from a group consisting of metallic oxides, glass, silicates, and nitrides of silicon.

30. The machine of claim 28, wherein the chemical bonding agent is a having a low dielectric constant.

31. The machine of claim 28, wherein the soft magnetic material is iron-cobalt.

32. The machine of claim 28, wherein the soft magnetic material is silicon steel.

33. The machine of claim 30, wherein the bonding agent provides magnetic insulation between the laminations.

34. The machine of claim 30, further comprising:
first and second end caps bonded to the laminations by the chemical bonding agent; and
a plurality of bearings for supporting the rotor assembly within the housing.

35. A machine comprising:
a housing;
a rotor assembly including a shaft,
a stator assembly mounted to the housing, having a stack of laminations, each lamination formed from a soft magnetic material; and a chemical bonding agent disposed over axial facing surfaces of each of the laminations, the laminations being bonded together by the chemical bonding agent, such that the laminations maintain a bond in operating temperatures up to 1000 degrees Fahrenheit, and the laminations and the chemical bonding agent having matching coefficients of thermal expansion, the shaft being bonded to the stack of laminations by the chemical bonding agent.

36. The machine of claim 35, wherein the chemical bonding agent is selected from a group consisting of metallic oxides, glass, silicates, and nitrides of silicon.

37. The machine of claim 35, wherein the chemical bonding agent is a having a low dielectric constant.

38. The machine of claim 35, wherein the soft magnetic material is iron-cobalt.

39. The machine of claim 35, wherein the soft magnetic material is silicon steel.

40. The machine of claim 37, wherein the bonding agent provides magnetic insulation between the laminations.

41. The machine of claim 37, further comprising first and second end caps bonded to the laminations by the chemical bonding agent.

42. The machine of claim 37, further comprising a sleeve or housing bonded to an outer diameter or inner diameter of the laminations by the chemical bonding agent.

43. A machine comprising:
a housing;
a rotor assembly including a shaft,
a stator assembly mounted to the housing, having a stack of laminations, each lamination formed from a soft magnetic material; and a chemical bonding agent disposed over axial facing surfaces of each of the laminations, the laminations being bonded together by the chemical bonding agent, such that the laminations maintain a bond in operating temperatures over 1000 degrees Fahrenheit, and the laminations and the chemical bonding agent having matching coefficients of thermal expansion, the shaft being bonded to the stack of laminations by the chemical bonding agent.

44. The machine of claim 43, wherein the chemical bonding agent is selected from a group consisting of metallic oxides, glass, silicates, and nitrides of silicon.

45. The machine of claim 43, wherein the chemical bonding agent is a having a low dielectric constant.

46. The machine of claim 43, wherein the soft magnetic material is iron-cobalt.

47. The machine of claim 43, wherein the soft magnetic material is silicon steel.

48. The machine of claim 45, wherein the bonding agent provides magnetic insulation between the laminations.

49. The machine of claim 45, further comprising first and second end caps bonded to the laminations by the chemical bonding agent.

50. The machine of claim 45, further comprising a sleeve or housing bonded to an outer diameter or inner diameter of the laminations by the chemical bonding agent.

51. The assembly of claim 1, wherein a chemical bonding agent is disposed over radial facing surfaces of each of the laminations.

52. The machine of claim 12, wherein a chemical bonding agent is disposed over radial facing surfaces of each of the laminations.

53. The assembly of claim 21, wherein a chemical bonding agent is disposed over radial facing surfaces of each of the laminations.

54. The machine of claim 28, wherein a chemical bonding agent is disposed over radial facing surfaces of each of the laminations.

55. The machine of claim 35, wherein a chemical bonding agent is disposed over radial facing surfaces of each of the laminations.

56. The machine of claim 43, wherein a chemical bonding agent is disposed over radial facing surfaces of each of the laminations.

* * * * *